Nov. 9, 1937.  A. J. WOHLGEMUTH  2,098,605
TELAUTOGRAPH RECEIVER
Filed Feb. 14, 1935

INVENTOR
Adolph J. Wohlgemuth

Patented Nov. 9, 1937

2,098,605

UNITED STATES PATENT OFFICE 2,098,605

TELAUTOGRAPH RECEIVER

Adolph J. Wohlgemuth, Brooklyn, N. Y., assignor to Thomas Electric Company, West New York, N. J.

Application February 14, 1935, Serial No. 6,504

4 Claims. (Cl. 178—19)

The object of this invention is to provide means for graphical representation over lines of considerable length.

Another object of this invention is to provide means for using a large and varying number of telautographic instruments in multiple over two small gauge transmission lines.

The further object of this invention is to provide a sensitive penlifter circuit that can be used over long lines in a large multiplicity.

Another object of this invention is to enable alternating or direct current to be applied to the rheostats of the transmitter, and to enable alternating current to be used at one end with direct current at the other end.

Still another object is to enable the receiver to operate with substantially no current flowing from the transmitter to the receiver.

A further object is to enable any amount of current desired, from substantially zero to the limit of the line, to flow from the transmitter to the receiver.

A still further object is to accomplish the purpose with the simplest equipment and in the most economical manner.

Referring to the drawing.

Figure 1:
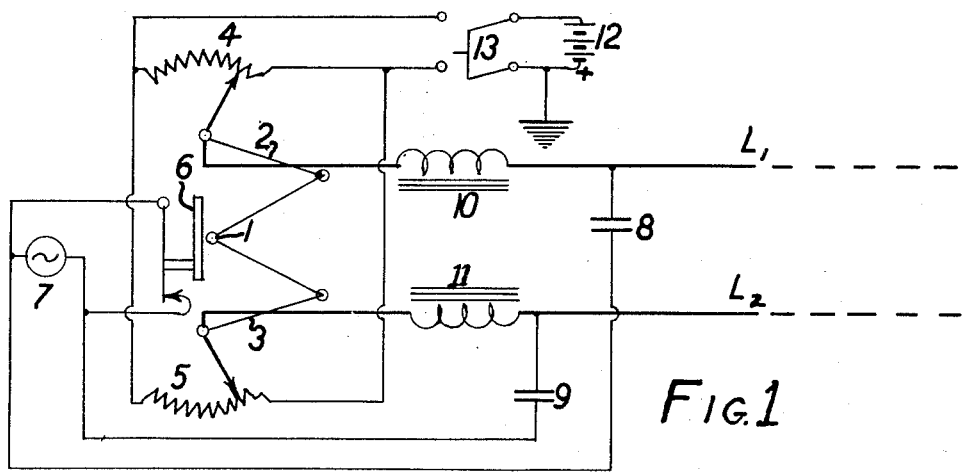
Figure 1 is a circuit diagram of a telautograph transmitter illustrating the principle of operation.
Figure 2:
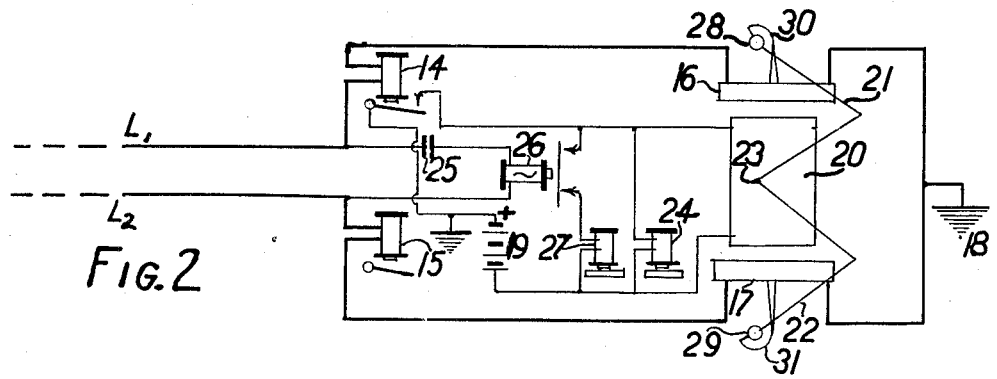
Figure 2 is the circuit diagram, illustrating a type of telautograph receiver to show the principle of operation.

In Figure 1 and Figure 2 there is shown for the purpose of illustration a circuit diagram outlining one of the various types of telautograph systems, the method of operation of which is as follows:

An operating stylus 1 is connected to a linkage system 2 and 3 having two degrees of freedom. The movement of the linkage arms 2 and 3 controls two rheostats 4 and 5, one for each degree of freedom, which in turn vary the direct current potentials applied to the two separate circuits $L_1$ and $L_2$.

The apparatus for touching the pen to the paper and lifting it off is controlled by the pressure of the stylus on platen 6. In writing, this pressure disconnects a short circuit across an alternating current channel from source 7 which is superimposed on the two direct current channels from lines $L_1$ and $L_2$ by the capacitive coupling of condensers 8 and 9. To prevent this alternating current from short circuiting through the rheostats 4 and 5, the chokes 10 and 11 are connected in lines $L_1$ and $L_2$ of high inductance but low resistance. The direct current for this system is supplied by battery 12 through switch 13. The positive terminal of the battery 12 is grounded.

At the receiving end, shown in Figure 2, the direct currents operate two relays 14 and 15 and actuate two solenoids 16 and 17 and return to the battery by the earth connection 18. When relay 14 is energized, the contact on it closes the circuit for the battery 19 to energize the field coil 20. This energizes the field coil 20 very strongly, making it a large magnet of which one pole is a North pole and the other a South pole. The solenoids 16 and 17 are so wound that, using the law that like poles repel and unlike poles attract, they are moved to a position of equilibrium against a spiral spring attached to shafts 28 and 29. The rheostats 4 and 5 are so shaped that the solenoids move the rotatable segments 30 and 31 until the linkage 21 and 22 assume the same position as the linkage 2 and 3. This causes the pen 23 to execute a motion reproducing that of the sending stylus 1.

The paper shifting mechanism 24 is operated by the contacts on relay 14 which in turn is operated from the transmitter by switch 13. The mechanism for lifting the pen is actuated by the alternating current coming over the lines $L_1$ and $L_2$ from the source 7. At the receiver, it is given a low impedance path thru condenser 25 and alternating current relay 26, and a high impedance path through the solenoids 16 and 17 on account of the high inductance of the windings of relays 14 and 15. In that way, the alternating current is largely confined to the path through condenser 25 and alternating current relay 26. It was noted that when the stylus 1 is raised, there is a short circuit at platen 6 and no alternating current flows. When no alternating current flows, the armature of relay 26 falls back, closing the circuit from battery 19 through the contacts of relay 14, through the back contacts of relay 26, thru the penlifter mechanism shown as 27, back to the battery 19. The penlifter mechanism 27 thus energized, lifts the pen off of the paper.

However, when the stylus 1 is pressed on platen 6, the circuit at platen 6 is opened and alternating current flows from source 7 through the condensers 8 and 9 over lines $L_1$ and $L_2$ to condenser 25 and relay 26. When the relay 26 is thus energized the circuit is opened and the armature of the penlifter mechanism 27 falls back allowing the pen to touch the paper.

Figure 3:
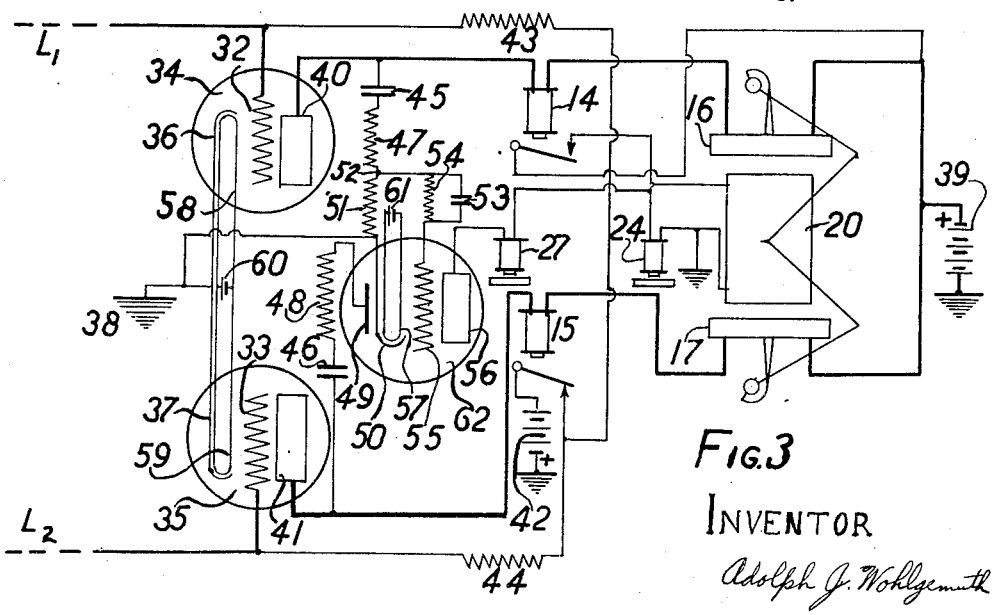
Figure 3 is the circuit diagram of the telautograph receiver of this invention.

Referring to Figure 3 considering that the same voltages are on lines $L_1$ and $L_2$ as are illustrated by Figure 1, the direct current voltage is applied to the grids 32 and 33 of vacuum tubes 34 and 35. The cathodes 36 and 37 are connected together to ground 38. The voltage from battery 39 is applied to the plates 40 and 41 through the solenoids 16 and 17 and the relays 14 and 15. Since the voltages as shown are negative to ground on the lines $L_1$ and $L_2$ and the voltage on the plates 40 and 41 are positive to ground, and the cathodes 36 and 37 are grounded, the voltage on the grid controls the plate current and can reduce the plate current to zero by increasing the negative grid voltage to the cut-off voltage of the tube and the plate current will be maximum when the negative grid voltage is zero. Thus the current through the solenoids 16 and 17 can be varied from zero to maximum by means of the rheostats 4 and 5. However, the variation of resistance in the rheostat will not be the same as for the direct connection of the solenoids 16 and 17 as shown in Figure 2. It will be noted that the potential of the grid is kept negative at all times with respect to the cathode in order that the grids 32 and 33 shall not draw current. By placing resistances from each line $L_1$ and $L_2$ to ground 38 current can be drawn over the lines without having the grids 32 and 33 use current and so still use the static characteristics of the tube.

The operation of paper shifter 24 and the field 28 from battery 39 through the contacts of relay 14 through the paper shifter 24 and the field 28 to ground, and the other side of battery 39, is the same as described previously.

However when the current reaches a certain minimum value, the armature of relay 15 falls back before the armature of relay 14 does, and connects the negative bias from battery 42 through the back contact of relay 15 and through resistances 43 and 44 to lines $L_1$ and $L_2$ respectively, biasing them to cut-off, so that switch 13 may be opened. If that were not done, the grids would have no negative bias on them and the maximum plate current for the circuit would flow.

If the switch 13 is closed again, a certain current will flow over the line from battery 42 through resistors 43 and 44, through lines $L_1$ and $L_2$ through the rheostats 4 and 5 to ground at battery 12. The current will be very small as it will be due only to the difference in potential between battery 42 and the potential of the point on rheostats 4 and 5 corresponding to the position of the stylus. However resistors 43 and 44 are of the order of three to six megohms, so that even a small current causes a comparatively large voltage drop across them. As the stylus 1 is moved from the position of minimum current, the potential difference between the point on the rheostats and battery 42 will be increased causing more current to flow and hence a larger drop across resistors 43 and 44 until the voltages at grids 32 and 33 are below the cut-off voltage. Current will then flow in the plate circuits picking up relay 15 to remove the bias voltage and relay 14 to shift the paper and energize the field.

When the stylus is depressed and an alternating potential is applied to the lines $L_1$ and $L_2$ as previously described, the voltage comes in on lines $L_1$ and $L_2$ to grids 32 and 33, thence to plates 40 and 41 of vacuum tubes 34 and 35. As before, relays 14 and 15 prevent the alternating current from flowing through the solenoids 16 and 17. The alternating current then follows the path from plate 40 through condenser 45 and resistances 47 and 51 to the cathode 50 of vacuum tube 62. Then the path is to the diode plate 49, the resistance 48, and the condenser 46 to plate 41.

The action of the diode plate is to rectify the alternating current. This causes a potential to be set up across resistance 51 with point 52 to be at a negative potential with respect to the cathode 50. That negative potential is applied to the grid 55 of a triode in the same tube 62 through grid leak 54 and condenser 53. The value of resistance 51 is so chosen that the grid 55 is biased to cut-off when the alternating current is flowing. The plate 56 is connected to penlifter 27 and through that and through the contacts of relay 14 to the battery 39.

From the foregoing it can be seen that when no alternating current is applied, the plate current will be maximum since there will be no grid bias thus energizing the penlifter 27 and lifting the pen off the paper. However, when the stylus 1 is pressed on platen 6, the short circuit is removed and the alternating current from source 7 is applied to the lines $L_1$ and $L_2$. This is impressed into the plate circuits 40 and 41 of vacuum tubes 34 and 35 and thence through condensers 45 and 46 and resistances 47, 48 and 51 to the diode unit of vacuum tube 62. The rectifying action of the diode sets up a negative bias across resistance 51 which at 52 is applied to the grid 55 to cut-off the plate current from penlifter 27 allowing the pen to press on the paper.

There are also batteries 60 and 61 to supply current for the heaters 57, 58, and 59.

If battery 12, in the transmitter, is replaced by an alternating current generator of a frequency widely different from the frequency of alternating current generator 7, the receiver in Figure 3 will operate as described, provided a negative bias is connected to grids 32 and 33 of vacuum tubes 34 and 35.

While the foregoing is a description and explanation of the particular circuit illustrated, I am aware that those skilled in the art will see numerous other arrangements that can be made without departing from the spirit of the invention.

What I therefore claim is:

1. A telautographic communication system comprising a sending station, a source of direct current at the sending station, a pair of lines, a receiving station, vacuum tubes connected to said lines at the receiving station, a pair of relays responsive respectively to different minimum currents controlling the graphic representation means and each connected to the plate of one of said vacuum tubes and a source of auxiliary potential at the receiving station in the circuit controlled by the relay responsive to the higher minimum current, and means for applying said auxiliary potential to the control electrodes of said vacuum tubes on the passage of said higher minimum current to cut off the current in the plate circuits of said vacuum tubes.

2. In a telautographic receiver, a vacuum tube including a control electrode and an output electrode, a communication line, a direct connection from the line to the control electrode, graphic representation means connected to said output electrode, and means for applying an auxiliary negative potential to the control electrode to increase the total negative potential thereon to the cut off potential of said tube when the current in said output electrode falls below a predetermined minimum.

3. In a telautographic communication system, a source of alternating current potential, a pair of operating lines, vacuum tubes connected to each of said pair of lines, graphic representation means in the output circuits of said vacuum tubes, a resistance and rectifier connected in series and the combination connected in shunt of the output circuits of said vacuum tubes, a thermionic tube having a control electrode and an output electrode, a penlifting mechanism connected to the output electrode of said thermionic tube, and a connection between the control electrode of said thermionic tube and a predetermined point on said resistance to bias said control electrode to cut off and thus release said pen lifting mechanism when said alternating current potential is applied to the lines.

4. In a telautographic communication system, a source of direct current potential, a source of alternating current potential, a pair of operating lines, a graphic representation device, a circuit including electromagnetic means for operating said device in a plane by said direct current, and a circuit including a rectifier, a condenser, and a biasing resistance connected in series between said operating lines, responsive to said alternating current through the control electrode of a vacuum tube connected to the biasing resistance, the output electrode of said vacuum tube connecting to electromagnetic means for moving said graphic representation device at right angles to said plane.

ADOLPH J. WOHLGEMUTH.